United States Patent Office 3,099,515
Patented July 30, 1963

3,099,515
SILICON CHLORIDE TREATED POLYOLEFIN
ARTICLE AND ITS PRODUCTION
Eric Paul Goodings, William Alexander O'Neill, and George Wright Taylor, all of Harrogate, England, assignors to Imperial Chemical Industries Limited, London, England, a corporation of Great Britain
No Drawing. Filed June 27, 1960, Ser. No. 38,706
Claim priority, application Great Britain July 8, 1959
9 Claims. (Cl. 8—82)

This invention relates to the treatment of polyolefine articles, in particular the treatment of fibres and films composed of stereoregular polyolefines to improve their affinity for dyestuffs.

The work of Ziegler and Natta involving the discovery of stereospecific catalysts and their application to the polymerisation of olefinic hydrocarbons to polymers having a regular molecular structure is now well known. The new stereoregular polyolefines, such as the poly-alphaolefines described in British Patent No. 810,023, have proved a valuable source of fibres, films and other shaped articles and commercial development is in progress. The hydrophobic nature of these polymers is, however, a disadvantage in so far as it results in poor dye-receptivity and this is, of course, a serious drawback in textile fibres.

We have made the observation that the properties of stereoregular polyolefines can be profoundly affected by treatment with compounds containing a covalent linkage which can penetrate into the polymer structure and can be converted in situ into an ionic species. Compounds of an ionic character cannot leave the hydrophobic polyolefine and they therefore become trapped therein so providing sites of dye affinity. The foregoing procedure may be carried out on the polyolefine prior to the shaping process but is much more readily applied in the form of an after-treatment of the shaped articles particularly of fibres which expose a large surface area to the reagents.

According to our invention we provide a process for improving the dye affinity of shaped articles containing or composed of stereoregular polyolefines characterised in that the shaped article is treated with a fusible and hydrolysable acid halide of a phosphorus or silicon. The process is applicable to articles of stereoregular polyolefines in general but is particularly effective with stereoregular polyalphaolefines including isotactic polypropylene.

By fusible and hydrolysable acid halide is meant an acid halide having a melting point not in excess of 300° C. which can be hydrolysed by water alone. Acid halides which fall within the scope of our invention are the halides, particularly the chlorides, of silicon. Oxyhalides, such as the oxychlorides of phosphorus are equally suitable and we have obtained most effective results by treating filaments and fibres of isotactic polypropylene with phosphorus compounds having the general formula

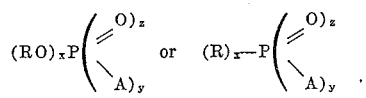

where $x=0$ to 2; $y=1$ to 3, $z=0$ or 1, $x+y=3$; R=alkyl or aryl and A=Cl or Br.

Amongst these phosphorus compounds phosphorus oxychloride is most satisfactory since it is readily available and is rapidly assimilated by the polyolefine. The polyolefine article may be contacted with the acid halide in undiluted form or in the presence of an inert liquid. The acid halides may also be utilised in the form of molecular complexes, for example with organic bases such as pyridine or with dioxan. Heat may be applied to assist penetration of the reagent but it is, of course, desirable to operate at as low a temperature as possible to minimise degradation of the polymer. In general we have found it advantageous to use acid halides having small, simple molecules since these act quickly and contact times of one minute or less become possible. In this way continuous feeding of the shaped article, e.g. a filament, through a contact zone is quite feasible and the acid halide treatment may be integrated with a melt extrusion process. For fibres of isotactic polypropylene this can be done by extruding a multifilamentary yarn at about 230–280° C. and combining a number of these yarns in the form of a continuous tow which is then led through an acid halide bath at such a rate and temperature as allows an adequate uptake of the reagent before drawing and orienting the yarn, e.g. in a steam jet or zone.

Assimilation of the acid halide by the polyolefine article may, as already indicated, be followed by a treatment with water or steam so that there is formed the corresponding ionisable acid or hydroxide of the phosphorus or silicon. For example, from phosphorus oxychloride acid and hydrochloric acid are obtained. Similar reactions occur when other hydroxylated liquids are used in place of water. Alternatively after imbibing acid halide, the article may be brought into contact with a basic substance such as ammonia or an amine. The basic substance may be used in undiluted form, in aqueous solution or in an anhydrous organic solvent. In this way the phosphorus or silicon can be converted in situ to a nitrogenous derivative thereof. While by the procedure involving water alone the resultant affinity for dyestuffs is essentially for the basic and dispersed classes the alternative technique gives good affinity for acid dyestuffs and has the added advantage that free acid occluded on the surface of the article is more effectively removed. The secondary treatment with water, ammonia, amines and so on may be carried out in liquid or vapour phase by spraying, padding or immersion and the reagents may be applied to polyolefine fibres in any manner known for the application of textile auxiliary agents including the use of superatmospheric pressure. It will be appreciated that a separate secondary treatment is not essential and the article may be dyed immediately after assimilation of acid halide, preferably in an aqueous dyebath. It is, however, advantageous to introduce a secondary treatment as an independent step since conversion of the acid halide to an ionisable derivative yields a very stable polyolefine article having good general dye-receptivity which can be conveniently marketed.

In the tabulated examples which illustrate our invention the polyolefine articles were all obtained from stereoregular polymers.

Table I

| No. | Shaped article | Acid halide treatment |
|---|---|---|
| 1 | Polypropylene fibre | Immersed in $POCl_3$ at 40° C. for 5 minutes. |
| 2 | do | Immersed in $CH_3OPOCl_2$ at 40° C. for 5 minutes. |
| 3 | do | Immersed in $C_2H_5POCl_2$ at 40° C. for 5 minutes. |
| 4 | Polyethylene film | Immersed in $POCl_3$ at 40° C. for 1 minute. |
| 5 | Fibre consisting of propylene/ethylene 75/25 copolymer. | Immersed in $POCl_3$ at 40° C. for 5 minutes. |
| 6 | Mixture of polypropylene and polytetrafluoroethylene filaments in equal amounts. | Do. |
| 7 | Mixture of polypropylene and polyethylene terephthalate fibres in equal amount. | Immersed in $POCl_3$ at 40° C. for ½ minute. |
| 8 | Polypropylene fibre | Immersed in boiling silicon tetrachloride for 1 minute. |

The products of experiments 1–8 were readily dyed by means of dispersed acetate and basic dyestuffs, including Dispersol Fast Scarlet, Methyl Violet, Malachite Green, Methylene Blue and Magenta, applied from aqueous dyebaths in known manner. It was also possible, following a secondary treatment with hot water for 10 minutes, to keep the olefine fibres Nos. 1–8 for an indefinite period before dyeing.

Table II

| No. | Shaped article | Acid halide treatment | Secondary treatment |
|---|---|---|---|
| 9 | Polypropylene fibre. | $POCl_3$ at 60° C. for 1 minute. | Boiled with dilute aqueous ammonia before dyeing. |
| 10 | do | do | Immersed in 10% (weight) solution of hexamethylene diamine in chloroform at the boil. |
| 11 | do | do | Immersed in liquid ammonia for ½ minute. |
| 12 | do | do | 1% (weight) ethylene diamine added to dyebath. |

The products of experiments 9–11 all showed good affinity for dispersed acetate dyestuffs and for acid dyestuffs including Naphthalene Scarlet 4R (Colour Index Acid Red 18), Solway Blue RN (C.I. Acid Blue 14) and Lissamine Fast Red B (C.I. Acid Red 37).

Similar results were obtained under the conditions of experiments 10 and 11 when other bases such as hydrazine, hydroxylamine, methylamine, diethylamine, pyrrolidine, pyridine and quinoline were substituted for hexamethylene diamine and ammonia.

In experiment 12 an anthraquinone type blue dispersed dyestuff was used in an aqueous dyebath containing the base to illustrate combination of the secondary treatment and actual process of colouration.

What we claim is:
1. A process for improving the dye affinity of shaped articles consisting essentially of stereoregular polyolefins which comprises treating said article with a fusable and hydrolysable acid halide of silicon.
2. A process according to claim 1 wherein the shaped article is selected from the group consisting of filament, fibre and film.
3. A process according to claim 1 wherein the shaped article consists essentially of a stereoregular polymer of an alpha olefin.
4. A process according to claim 3 wherein the stereoregular poly alpha olefin is isotactic polypropylene.
5. A process according to claim 1 wherein the shaped article after assimilation of acid halide is further treated with water at an elevated temperature.
6. A process according to claim 1 wherein the shaped article after assimilation of acid halide is further treated with a member selected from the class consisting of ammonia and amines in aqueous solution.
7. A process according to claim 1 wherein the shaped article after assimilation of acid halide is further treated with a member selected from the class consisting of ammonia and amines in aqueous solution.
8. A process according to claim 1 where in the nitrogenous base is ammonia.
9. Shaped articles consisting essentially of stereoregular polyolefin treated by the process of claim 1.

References Cited in the file of this patent

UNITED STATES PATENTS

| | | |
|---|---|---|
| 2,025,072 | Osborne | Dec. 24, 1935 |
| 2,167,234 | Dreyfus | July 25, 1939 |
| 2,465,319 | Whinfield et al. | Mar. 22, 1949 |
| 2,668,134 | Horton | Feb. 2, 1954 |
| 2,910,461 | Nowlin et al. | Oct. 27, 1959 |
| 2,920,062 | McFarland | Jan. 5, 1960 |
| 2,945,010 | Caldwell et al. | July 12, 1960 |
| 3,029,121 | Collins | Apr. 10, 1962 |
| 3,039,840 | Sawaya | June 19, 1962 |

FOREIGN PATENTS

| | | |
|---|---|---|
| 697,983 | Great Britain | Oct. 7, 1953 |
| 822,483 | Great Britain | Oct. 28, 1959 |

OTHER REFERENCES

C.A., vol. 5, 1911, pp. 587 and 1845.
C.A., vol. 31, 1937, p. 2809.
Finch: Fibres and Plastics, January 1960, 8-Vinyon, pp. 14–16.
Hobbs et al.: J.A.C.S., vol. 76, 1954, pp. 1254–1257.
J.S.D.C., October 1949, pp. 469–478.